March 4, 1952 W. C. ANDERSON 2,587,951

SCREW SLOTTER

Filed June 26, 1946 7 Sheets-Sheet 1

Inventor
William C. Anderson
BY By:- Moore, Olson & Trexler attys.

INVENTOR.
William C. Anderson
BY
Moore, Olson & Trexler
Attys.

March 4, 1952 W. C. ANDERSON 2,587,951

SCREW SLOTTER

Filed June 26, 1946 7 Sheets-Sheet 3

INVENTOR.
William C. Anderson
BY
Moore, Olson & Trexler
Attys.

March 4, 1952 W. C. ANDERSON 2,587,951

SCREW SLOTTER

Filed June 26, 1946 7 Sheets-Sheet 4

INVENTOR.
William C. Anderson
BY
Moore Olson & Trexler
Attys.

March 4, 1952 W. C. ANDERSON 2,587,951

SCREW SLOTTER

Filed June 26, 1946 7 Sheets-Sheet 5

INVENTOR.
William C. Anderson
BY
Moore, Olson & Trexler
Attys.

March 4, 1952 W. C. ANDERSON 2,587,951

SCREW SLOTTER

Filed June 26, 1946 7 Sheets-Sheet 6

INVENTOR.
William C. Anderson
BY
Moore, Olson & Trexler
Attys.

March 4, 1952 W. C. ANDERSON 2,587,951

SCREW SLOTTER

Filed June 26, 1946 7 Sheets-Sheet 7

INVENTOR.
William C. Anderson
BY
Moore, Olson & Trexler
attys.

Patented Mar. 4, 1952

2,587,951

UNITED STATES PATENT OFFICE 2,587,951

SCREW SLOTTER

William C. Anderson, Oak Park, Ill., assignor to Illinois Tool Works, Chicago, Ill., a corporation of Illinois Application June 26, 1946, Serial No. 679,401

6 Claims. (Cl. 10—2)

The present invention relates to screw slotters and more particularly to machines for slotting the shanks of screws or similar elements, although the invention may be employed for head slotting as well as shank slotting.

Heretofore screw slotters, whether used for head slotting or shank slotting, have generally employed a rotating turret or wheel provided with a series of slots in the periphery. The wheel received screws or screw blanks from a screw chute and carried them in said slots, as the wheel was intermittently rotated, to a slotter. Each time that the head was brought to rest, a new screw was supplied to the turret at one station, and one of the screws already mounted in the turret was slotted at another station.

Such a machine has a very definite, relatively low, limit in respect to the maximum number of screws per minute at which it can be operated satisfactorily.

The invention contemplates the construction of a screw slotting machine which employs a reciprocating bar and multiple screw carrier moving from a central screw receiving station to one slotter station as the bar moves in one direction and to another slotter station as the bar moves in the opposite direction. The bar is actuated by a cam which has suitable dwells which enable the reciprocating bar to remain stationary during the time that one screw element is received and another screw element is slotted. The capacity of a machine of this type is two or three times as great as the slotters now in common use, i. e. its capacity, depending on the type and size of screw element, varies between three and four hundred per minute.

It, therefore, is an object of the present invention to provide an improved screw slotter which will have a relatively high rate of operation.

A further object of the present invention is to provide an improved screw slotter which employs a reciprocating bar for moving screws to and from the point where the screws are to be slotted.

A still further object of the present invention is to provide an improved screw slotter employing a reciprocating bar which during the slotting operation of the screw bodies is positively locked in position to insure accuracy in the slotting operation.

Other and further objects of the present invention subsequently will become apparent by reference to the following description taken in conjunction with the accompanying drawings which form a part of the present specification, and in which—

Figure 1:
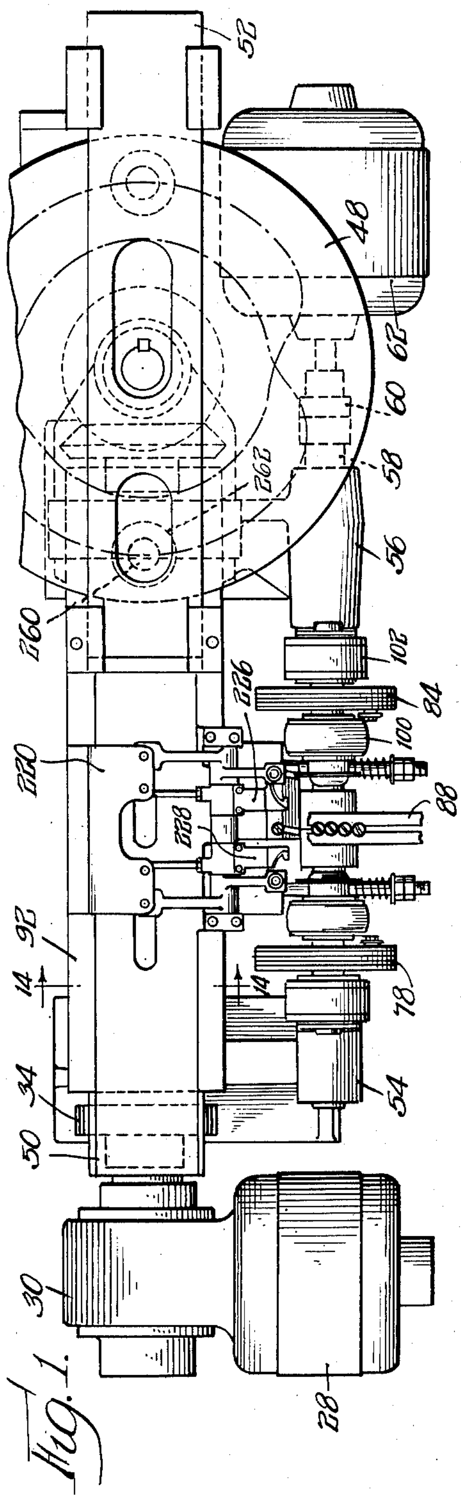
Figure 1 is a plan view of the apparatus constructed in accordance with the present invention.
Figure 2:
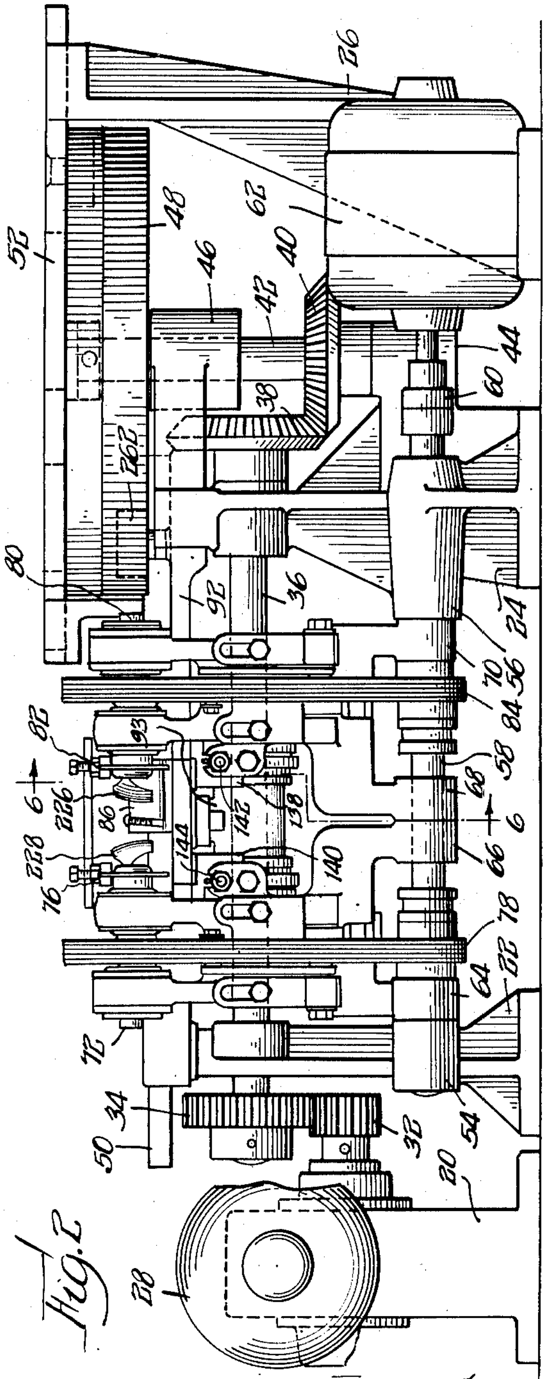
Figure 2 is a front elevation of the apparatus shown in Figure 1.

The general arrangement of the screw slotter comprising the present invention is readily apparent from Figures 1 and 2, from which it will be seen that the entire assembly is mounted on a plurality of base supports or pedestals 20, 22, 24 and 26. The support 20 carries a motor 28 which is connected to a gear box 30 which has a shaft supporting a gear 32. The gear 32 engages a gear 34 mounted on a drive shaft 36. The drive shaft carries a plurality of cams which subsequently will be described, and the drive shaft also has at one end a bevel gear 38.

The shaft 36 is supported in suitable bearing structures in the bases or pedestals 22 and 24. The gear 38 engages another bevel gear 40 which is secured to a shaft 42. The shaft 42 is mounted in two extension members 44 and 46 forming a part of the support 24. The shaft 42 carries a cam 48 which actuates a reciprocable bar 50. In order to equalize the load on the cam 48 a counterbalance bar 52 is supported in suitable guide members forming portions of the support bases 24 and 26. This counterbalance bar is driven by the upper portion of cam 48, which has a groove cut 180° opposite to the groove in the lower portion.

The base members 22 and 24 have forwardly extending bearing housings 54 and 56 which support a shaft 58 which is connected through a suitable coupling 60 to a motor 62. The shaft 58 has journaled on it a plurality of levers or arms 64, 66, 68 and 70 which support the screw slotters or saws. Two of the arms, 64 and 66, carry a shaft 72 which is provided with a suitable sprocket wheel for driving the shaft. One end of the shaft 72 is provided with a suitable fixture for holding a slot cutting saw 76. Interposed between the lower extremities of the arms 64 and 66 is a driving sprocket which is fixed to the shaft 58 and engages a driving chain 78 which preferably is of the silent chain type.

The arms 68 and 70 are similar to the arms 64 and 66 but are reversed in form and position. The arms 68 and 70 carry a shaft 80 which at one end is provided with a suitable fixture for supporting the slotting cutter or saw 82. Interposed between the lower extremities of the arms 68 and 70 is a driving sprocket which is fixed to the shaft 58 and engages a driving chain 84 which in turn engages a sprocket on the shaft 80.

The reciprocal bar 50, which is actuated by the cam 48, carries a screw element receiving and carrying block 86 which is arranged to receive screw blanks or headed screw elements from a chute 88.

Figures 3, 11, 12, 13, 14:
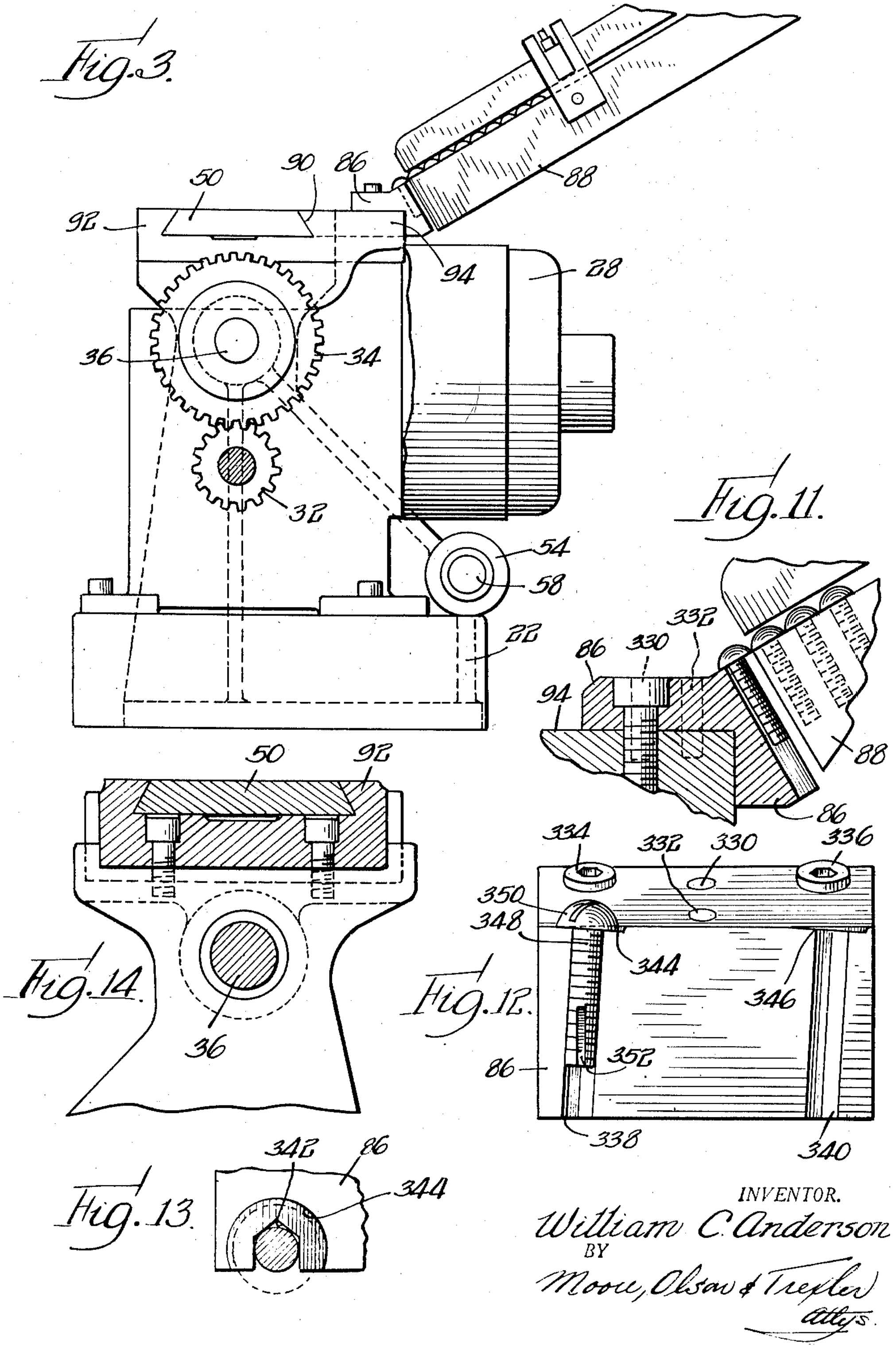
Figure 3 is an end view of the apparatus shown in Figures 1 and 2.
Figure 11 is a sectional view of a portion of the machine shown in Figure 4 as seen in the direction of the arrows along the line 11—11.
Figure 12 is an enlarged front view of the screw carrier.
Figure 13 is a plan view of a detail portion of the carrier shown in Figure 12.
Figure 14 is a cross section taken along the line 14—14 of Figure 1.
Figures 4, 8, 9, 10:
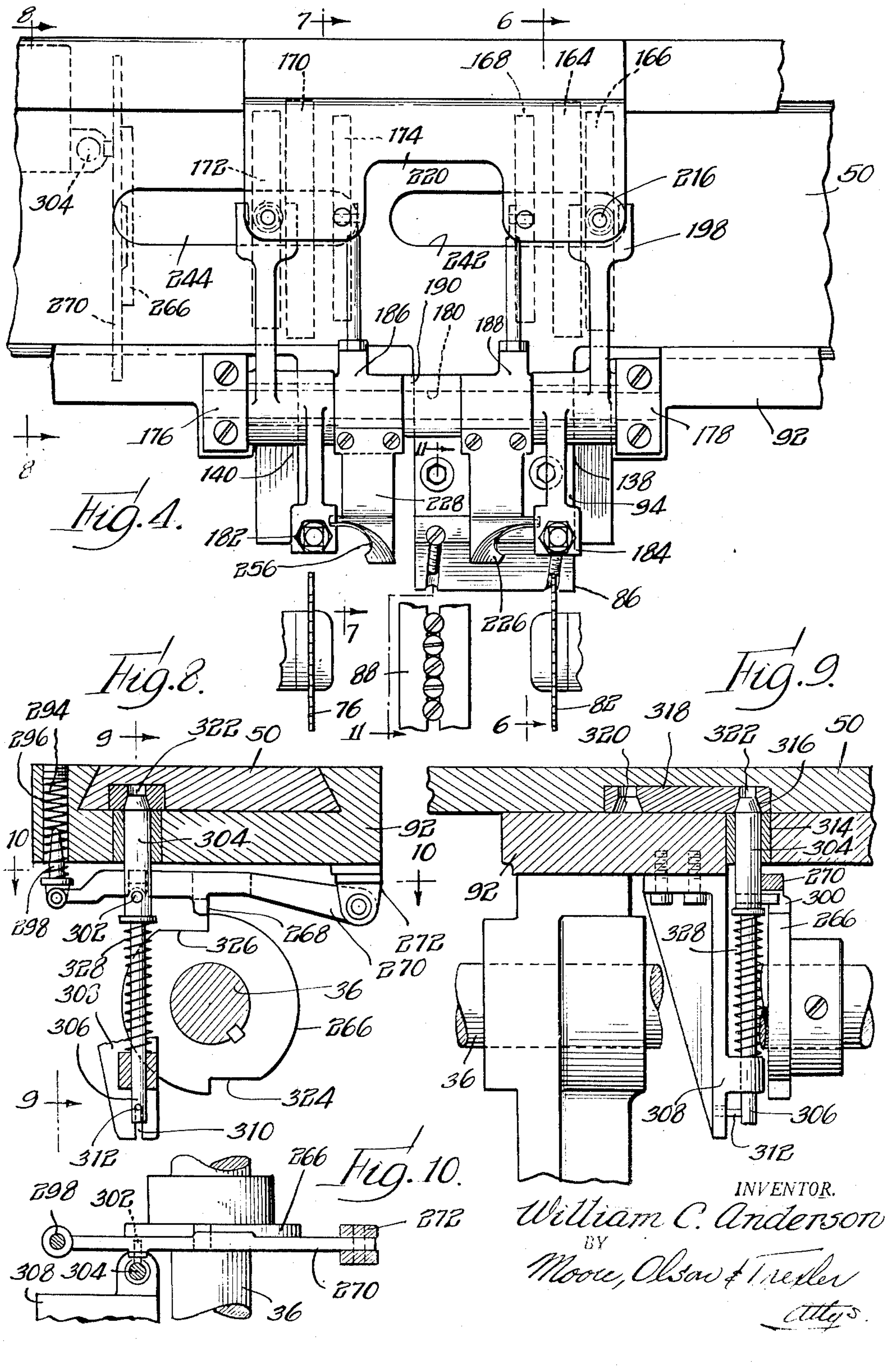
Figure 4 is an enlarged plan view of a portion of Figure 1.
Figure 8 is a cross-sectional view taken along the line 8—8 of Figure 4.
Figure 9 is a cross-sectional view as seen in the direction of the arrows along the line 9—9 of Figure 8.
Figure 10 is a view as seen in the direction of the arrows along the line 10—10 of Figure 8.

By referring to Figure 3, it will be seen that the chute 88 terminates closely adjacent the front surface of the block 86. The slide 50 preferably has tapered sides 90 which are fitted in a bed 92 which is supported by the supports 22 and 24 and carries an additional bearing structure 93 for the shaft 36. The bar 50 adjacent its central portion, as may be seen from Figure 4, is provided with a forwardly extending projection 94 which carries the block 86.

It was previously mentioned that the shaft 58 carried arms 64, 66, 68 and 70. Since the arms 66 and 68 are similar, and arms 64 and 70 are similar, a description of arms 68 and 70 will be sufficient for all of these arms. These latter arms are shown in Figures 5 and 6.

Figure 5:
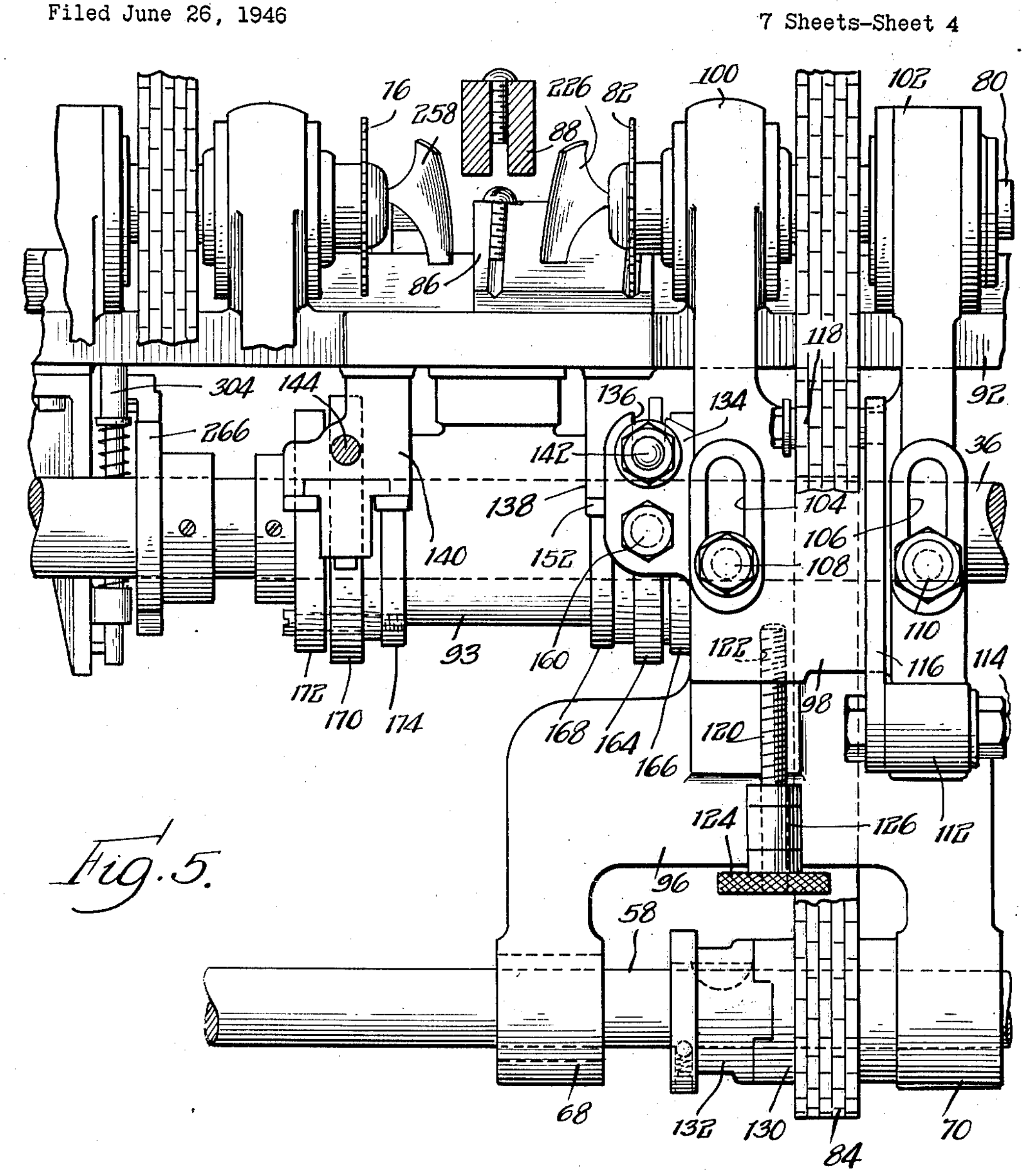
Figure 5 is an enlarged front elevation of a portion of Figure 2.
Figures 6, 7:
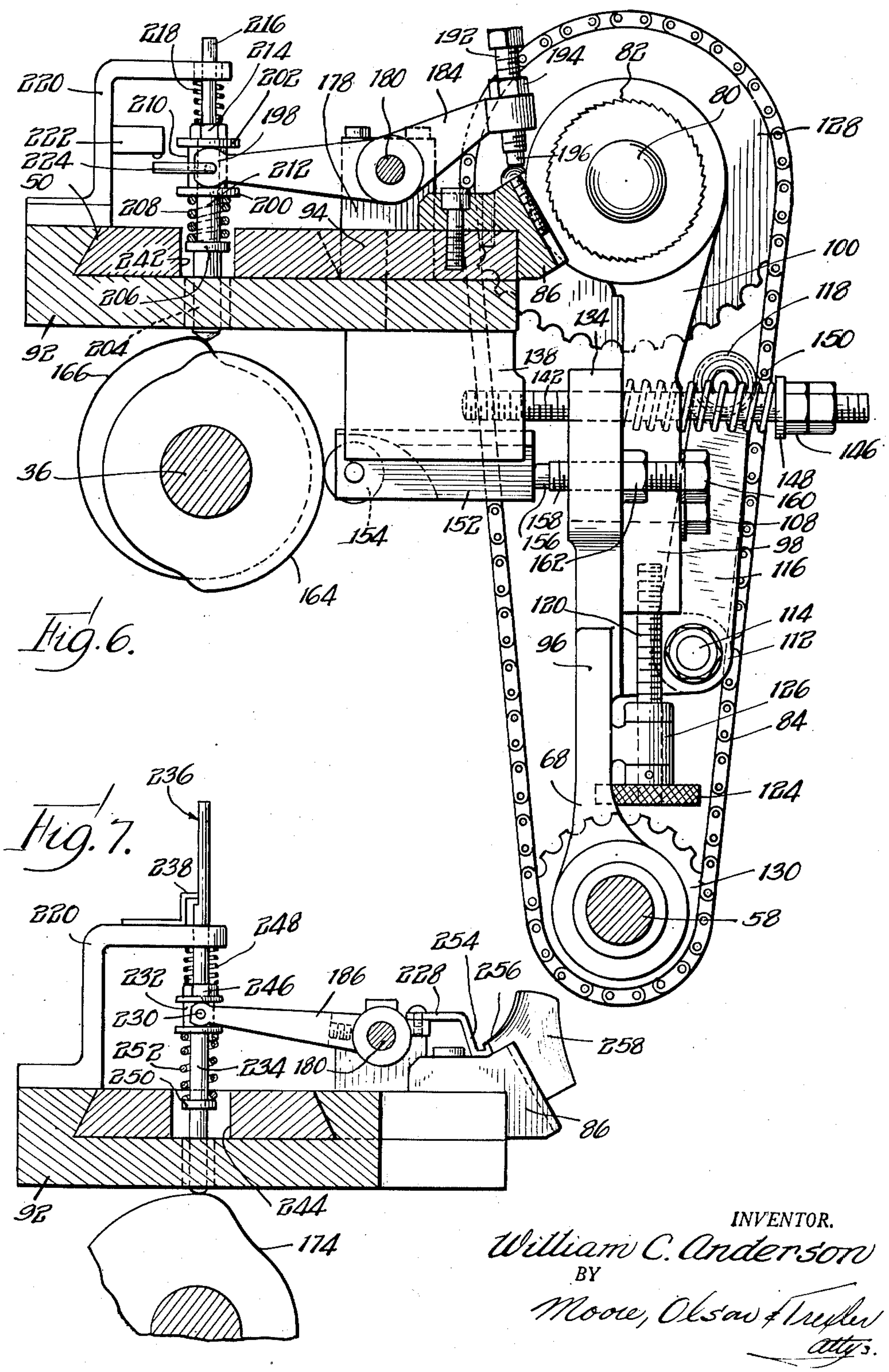
Figure 6 is a view in vertical section taken along the line 6—6 of Figure 4.
Figure 7 is a detailed view in vertical section taken along the line 7—7 of Figure 4.

From Figure 5 it will be seen that these arms 68 and 70 are interconnected by a bridge portion or bracket 96. The bridge portion 96 adjustably supports a bifurcated arm having a bridge portion 98 and outer extensions 100 and 102. The extensions 100 and 102 have bearings therein for supporting the shaft 80. The bridge portion 98 is provided with a plurality of slots 104 and 106 through which stud bolt fastening means 108 and 110 pass into the lower bridge 96. This adjustment is provided so that the center line through the shaft 80 and through the saw 82 may be adjusted with respect to the screw element carrier so that slots can be correctly cut in different lengths of screws. The bifurcated arm 98 adjacent its lower end carries a boss 112 in which is mounted a bolt or shaft 114 on which is secured an arm 116.

The arm 116 at its upper end is provided with a shaft which carries an idler roller 118 which engages the silent chain 84. The position of the arm 116 may be fixed so as to provide the proper tension for the chain 84 by adjusting the position of the arm 116 on the shaft bolt 114.

The position of the upper extremities 100 and 102 of the bracket 98 may be adjusted by small increments by means of a threaded adjusting member or rod 120 which engages a threaded recess 122 in the bracket 98. The rod 120 at one extremity is provided with an adjusting knob or wheel 124 located adjacent a support boss 126 which forms a part of the bridge bracket 96 and in which the rod is journaled and to which it is held against longitudinal movement by collars pinned to the rod. The chain 84 passes over a sprocket wheel 128 which is secured to the shaft 80 and over a driving sprocket 130 which is connected to the driving shaft 58 by means of a clutch fixture 132 splined to the shaft. If desired, driving sprocket 130 can be keyed directly to shaft 58 without a clutch.

The bracket 96 is provided with an ear 134 which at its upper extremity is provided with a notch or recess 136. Depending from the bed 92 are a plurality of guide brackets 138 and 140, shown in Figures 2, 4, 5 and 6. The bracket 138 carries a threaded rod 142 and, similarly, the bracket 140 carries a threaded rod 144. Each of the rods at the outer extremity is provided with adjusting and clamping nuts 146 and a washer 148, and is surrounded by a spring 150 which bears at one end against the ear 134 or the corresponding ear of the other saw mounting bracket corresponding to the bracket 96. The washer 148 is engaged by the other end of a spring 150. The spring 150, therefore, urges the arm 68 and the saw slotter 82 associated therewith toward the screw carrier.

The depending bracket 138 carries a slide 152 which at one end is provided with a cam follower roller 154. At the other end of the slide 152 there is provided an adjustable stop 156 carried by the ear 134. The stop 156 is located at one extremity of an adjustable member 158 which has a head 160 and may be retained in position by a lock nut 162. This arrangement, therefore, determines the starting and stopping positions of the arm 68 as it is displaced angularly periodically in clockwise and counterclockwise directions as seen in Figure 6.

The cam follower 154 on the slide 152 bears against a cam 164 which is mounted on the main drive shaft 36. For coordinating the movement of the arms 68 and 70 with other cooperating elements, additional cams 166 and 168 are mounted on the shaft 36 in the proximity of the cam 164. Similarly, a plurality of corresponding cams 170, 172 and 174 are provided on the shaft 36 for the other arms 64 and 66 to control the movement of the slotting saw 76.

Certain of the elements which are coordinated in operation by the various cams 164, 166, 168, 170, 172 and 174 are shown in detail in Figures 4, 6 and 7. The bed plate 92 is provided with two similar, spaced posts 176 and 178 which carry a shaft 180. Journaled on the shaft are levers or arms 182, 184, 186 and 188 and a spacing sleeve 190. The several arms 182, 184, 186 and 188 are actuated by cams 172, 166, 174 and 168 respectively.

By referring more particularly to Figures 4 and 6, the structure of the arm 184 will be explained. The arm 184 at its forward end carries an adjustably positioned screw head engaging member or clamp comprising a threaded rod 192 which passes through a threaded opening in the outer extremity of the rod 184 and is retained in position by a lock nut 194. The lower extremity of the threaded rod 192 is provided with a reduced diameter portion 196 which is arranged to engage the head of a screw blank or headed screw body which is positioned in the block 86. The other extremity of the arm 184 is provided with a bifurcated portion 198 which is received between two collars 200 and 202. These collars are mounted on a cam follower rod 204 which has a lower extremity engaging the surface of the cam 166. The lower portion of rod 204 is provided with a fixed collar 206 for engagement by a spring 208 which bears against the lower collar 200. The collars 200 and 202 are formed on a sleeve 210 which surrounds a reduced diameter portion 212 of the cam follower rod 204. The position of the sleeve 210 is determined by the position of an adjusting nut 214 threaded on the rod portion 212. The upper portion 216 of the cam follower rod 204 is further reduced in diameter and is surrounded by a spring 218. The spring 218 bears against the adjusting nut 214 and against a guide bracket 220 mounted on the bed plate 92. The guide bracket 220 has an opening through which the reduced diameter portion 216 of the cam follower rod 204 passes.

In operation, the high part of cam 166 (Figure 6) raises rod 204, raising sleeve 210 and arm 184 against the action of the light spring 218. When screw clamp 196 contacts the head of a screw and rod 204 continues to rise by the action of cam 166, then spring 208 compresses, and the compression of this spring gives the clamping force to screw clamp 196.

It will be seen that when arm 184 has reached the limit of its travel due to a screw being clamped, sleeve 210, and collars 200 and 202 will remain stationary, even though rod 204 continues to rise a little farther, compressing spring 208, and raising nut 214 a little above collar 202.

The spring 218 lowers the sleeve and arm when permitted to do so by the low part of cam 166. Thus, the screw clamp 196 is spring controlled in both directions so that it accommodates itself to variations in the height and shape of screw heads, and so that obstructions in the path of movement of the screw clamp will not cause breakage of the drive mechanism.

Mounted on the bracket 220 (Figure 6) is an electric switch 222 arranged to be engaged by an extension 224 of the arm 184, in the event that the chute 88 has failed to supply bolts or screws to the block 86. In such case, the bifurcated portion 198 of the arm 184 will move upwardly, closing the $\frac{1}{32}$'' gap which is always present between collar 202 and nut 214 when a screw head is clamped, and the extension arm 224 will actuate the microswitch 222. The switch 222 may be connected in any suitable time delay alarm circuit or safety circuit (not shown) to warn the operator or to stop the machine after a predetermined time.

The arm 188 is positioned adjacent the arm 184 and carries an ejector device 226 (Figures 1, 4 and 5) for engaging the head of a screw element in the slide block 86 and ejecting said element therefrom as the block moves toward the chute 86. A similar ejector 228 (Figures 1, 2, 4, 5 and 7) is mounted on the arm 186. The arm 186 at its rear extremity is provided with a bifurcated arm portion 230 (Figure 7) fitting between the end collars of a sleeve 232 which surrounds the lower portion of a cam follower rod 234. The cam follower rod 234 engages the cam 174. The cam follower rod 234 at its upper extremity is formed with a flattened side 236 which bears against a guide member 238 mounted on the guide bracket 220.

In order that the various arms 182, 184, 186 and 188 may be actuated by their cam followers, the reciprocating bar 50 is provided with slots or apertures 242 and 244 so that the bar does not engage any of the cam follower rods.

The sleeve 232 (Figure 7) is limited in its upward movement relative to the rod 234 by a stop nut 246. A spring 248 is interposed between the stop nut 246 and the bracket 220. The spring 248 biases the cam follower rod 234 against the cam 174. The cam follower rod in its lower portion is provided with a collar or flange 250 for engagement by a spring 252 which engages the underside of the sleeve 232.

In operation, cam 174 (Figure 7) raises follower rod 234, spring 252, and sleeve 232, as a unit, and also raises arm 186, against the action of the light spring 248. The spring 248 lowers the rod, sleeve and arm when permitted to do so by the cam 174. The sleeve and arm are thus raised by the cam and lowered by light spring 248 acting on the cam rod. The chief function of the heavier spring 252 is to "give" or compress if some obstruction such as an improperly positioned screw, or non-standard sizes or shapes of screws, should get below the ejector at points 228, 256 or 258 (Figure 7), and cause obstruction and possible breakage.

The ejector 228 is formed with a downwardly bent portion 254, a forwardly and upwardly bent deflector portion 256 which engages the head of a screw in the carrier 86 and moves the screw outwardly therefrom to remove it from the carrier, and a depending deflector portion 258 which has a curvature such that the screws during the ejection operation will be deflected outwardly and downwardly from the screw carrier to fall into a suitable receptacle (not shown) beneath the machine. The ejector 226 is a duplicate of the ejector 228.

The slide 50 is provided with a stud 260 (Figure 1) which carries a roller 262 (Figure 2) which follows the cam groove in the cam wheel 48. The cam groove in the wheel 48 is so formed that a dwell portion of the order of 140° is provided for each limit position of the reciprocable bar 50. During the period of these dwells, the reciprocable bar 50 is latched in position so as to prevent movement of the bar 50 during the time that either of the slotting saws 76 and 82 is in engagement with a screw blank carried by the blank holder or carrier 86. In order to so lock the reciprocable bar 50 periodically, the locking device illustrated in Figures 8, 9 and 10 is provided. The main drive shaft 36 carries a cam 266 (Figures 8, 9 and 10) which actuates a cam follower 268 mounted at an intermediate point on a lever 270. The lever 270 is pivotally mounted on a depending support 272 which is secured to the underside of the bed plate 92 adjacent one side thereof.

The bed plate 92 adjacent the other side is provided with a recess 294 in which is mounted a relatively heavy spring 296. The spring 296 surrounds a pin 298 which is pivotally connected to the outer extremity of the arm 270. The lever 270 at a point between the outer extremity and the cam follower surface 268 is provided with a notch or recess 300 which receives a pin 302 mounted on, and extending transversely from, a lock pin 304. The pin 304 is mounted on, or formed integrally with, a reciprocable rod 306. The rod 306 is slidably mounted in a bracket 308 suitably secured to the underside of the bed 92. The bracket 308 adjacent its lower extremity is provided with a groove or slot 310 in which travels a guide pin 312, secured to the lower extremity of the rod 306. The lock pin 304 is slidably guided in a bearing member 314 mounted in the bed plate 92. The upper extremity of the lock pin 304 has a tapered portion 316.

The reciprocable slide 50 carries on its underside a hardened insert 318 having two apertures 320 and 322. These apertures are spaced apart a distance equal to the distance of movement of the reciprocable bar 50. The cam 266 has two active surfaces 324 and 326 so spaced that the lever 270 will be released for downward movement from the position shown in Figure 8 just prior to the time that the cam follower roller 262 leaves one of the two dwell portions of the cam 48. As soon as the cam follower 268 drops off one of the dwells of the cam 266 to engage one of the active cam surfaces 324 and 326, the lever 270 is moved downwardly by the stronger spring 296, thereby forcing withdrawal of the locking pin 304 from the recess 316 or 320 with which it was engaged. By the time the other limit of the movement of the reciprocable bar 50 is reached, the cam 266 will have raised the lever 270 and hence a spring 328, mounted between the boss on the bracket 308 and the lower extremity of the locking pin 304, will cause the locking pin to move upwardly into the other of the recesses 316 and 320.

From Figures 11, 12 and 13 it may be seen that the screw holding slide or carrier 86 is positioned accurately on the portion 94 of the reciprocating bar 50 by a plurality of pins 330 and 332. Two fastening bolts 334 and 336 are used to secure the slide 86 on the portion 94.

The slide 86 has in its forward face two recesses 338 and 340 which are inclined at an angle equal to the desired angle of inclination of the slot to the screw shank axis. The slots 338 and 340, as shown in Figure 13, may have a V-shaped bottom wall or surface 342 so that the screw elements may readily seat themselves in the recesses; may be firmly supported during slotting, and yet adequate clearance is provided to avoid improper seating due to dust, dirt or grease accumulating in the recesses. The forward face of the slide 86 is inclined to the vertical and is substantially perpendicular to the inclined feed chute 88 to facilitate the feeding of the screw elements to the slide and to present the screw shanks to the saws at the proper angle for slotting.

The heads 350 of the screw elements are received on inclined or recessed surfaces 344 and 346 normal to the recesses 338 and 340 which receive and position the shanks 348 of the screw elements for formation of the inclined slots 352 therein.

As shown in Figures 2, 4 and 5, the slot forming saws 76 and 82 are positioned in a vertical plane. However, the shafts of these saws may be mounted at an angle so as to tilt the saws at the desired slot-angle. In such case, the shank-receiving recesses 338 and 340 in the slide 86 may be vertical or perpendicular to the upper surface of the slide and the head-receiving recesses 344 and 346 eliminated.

In slotting screws of the type in which the slots are to be parallel to the shank axis, both the saws and the shank-receiving recesses may be disposed in vertical planes.

It will be evident that by removal of the Allen head attaching screws 334 and 336, the slide 86 may be removed for replacement by another similar slide having, however, different sizes of shank and head receiving recesses or recesses inclined at different angles or vertically disposed for handling a different size or type of screw element.

In operation the motor 62 continuously drives the slotter saws 76 and 82 through the common shaft 58, the plurality of silent sprocket chains 78 and 84 and the shafts 72 and 80. The saw mounting frames are alternately swung toward and from the screw carrier 86 under the control of the cams 170 and 164 driven by the motor 28, which also drives the slide bar 50 through the common shaft 36 and the cam 48.

Let it be assumed that the slide bar 50 is in the limit position shown in Figure 4 and that the screw element has been slotted by the saw 82. The slide bar 50 is first unlatched from the bed plate 92 and the cam 266 releases the lever 270 so that the spring 294 withdraws the pin 304 from the aperture 322. At the same time, or just prior thereto, the cam 166 (Figure 6) releases the rod 204 and the spring 218 raises the lever arm 184 to release the screw head clamp 196. The bar 50 then moves rapidly to the left to its other limit position.

As the bar 50 moves from the position shown in Figure 4 to its other limit position, the cam 174 releases the arm 186 (Figure 7) for downward movement by the spring 240 so that the ejector 228 is raised to permit the screw in the carrier 86 to pass thereunder.

The lever 188 is, however, raised, or held in raised position, during this movement of the screw carrier, by the cam 168 so that the screw ejector 226 is lowered and the screw head engaging deflector portion of this ejector, corresponding to the deflector portion 256 of the ejector 228, is engaged by the head of the screw and directs the screw outwardly from the carrier and releases it from the recesses 340 and 346. When the screw has been withdrawn from the recess, it engages that deflector portion of this ejector which corresponds to the deflector portion 258 of the ejector 228, and is tossed outwardly and downwardly from the screw carrier into a suitable receptable beneath the machine.

By the time the bar 50 reaches it other limit position, the cam 266 (Figure 8) will have raised the lever 270 and the spring 328 therefore snaps pin 304 into the aperture 320 to lock the bar in that limit position. At the same time, or just subsequent thereto, the cam 172 will, by raising a rod similar to the rod 204 of Figure 6, lower the lever arm 182 to clamp the screw to the carrier by means of a screw head engaging clamp similar to the clamp 196.

The screw carrier 86 is now so positioned that a screw element clamped in the recess 338 is positioned in the path of movement of the slotter saw 76. The cam 170 now releases the mounting frame for the saw 72 so that it is moved or swung inwardly by a spring corresponding to the spring 150 (Figure 6) and the saw 72 thereupon engages and slots the screw shank.

When the screw carrier is positioned in its left limiting position, the recess 340 in the screw carrier will be aligned with the screw feeding chute and the screw element will, therefore, fall into the recess from the feed chute.

As soon as the saw 76 has completed its slotting operation, the cam 170 forces a cam follower, corresponding to the follower 152 of Figure 6, outwardly to swing the saw frame and saw away from the screw carrier. The slide bar 50 is then released for movement to the right by operation of the cam 266, which releases the pin 304 for unlatching by the spring 294. The lever arm 182 is now raised by the cam 172; the bar 50 is moved to the right by the cam 48; the screw ejector 228 is lowered or held in lowered position by the cam 174 and the screw ejector 226 is raised by the cam 168. The slide bar, having reached its right limit position, is relatched by the pin 304 under the urging of the spring 328; the lever 184 is lowered by the cam 166 so as to clamp the screw in the carrier, and the saw frame 82 is then released for swinging movement toward the carrier, under the action of its spring 150.

Figure 15:
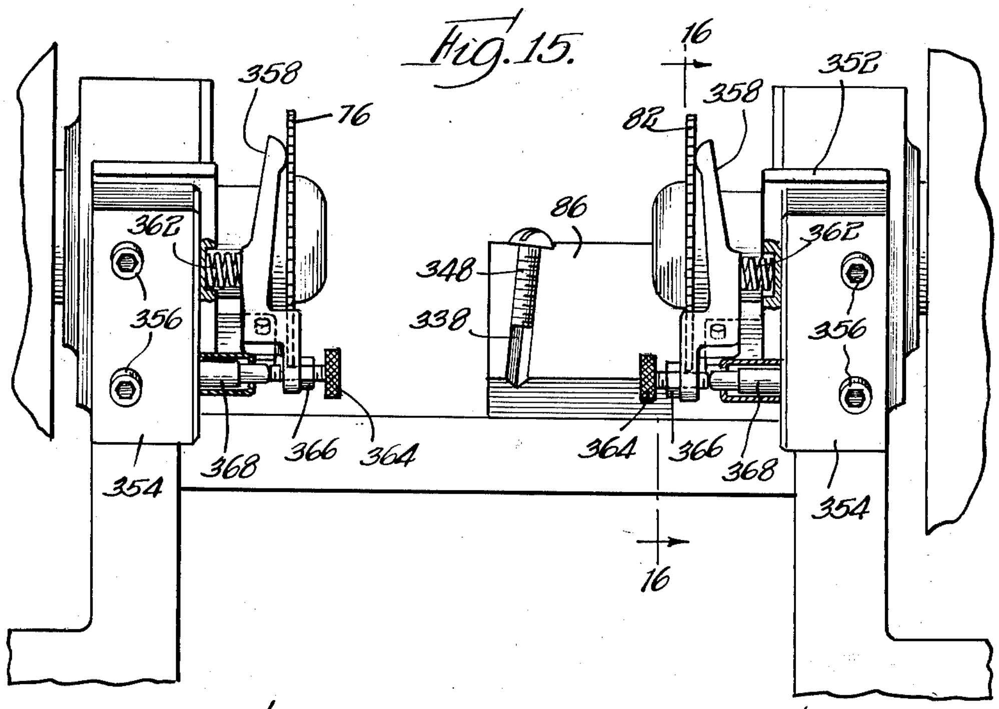
Figure 15 is a view similar to Figure 5, but showing a modification thereof.
Figure 16:
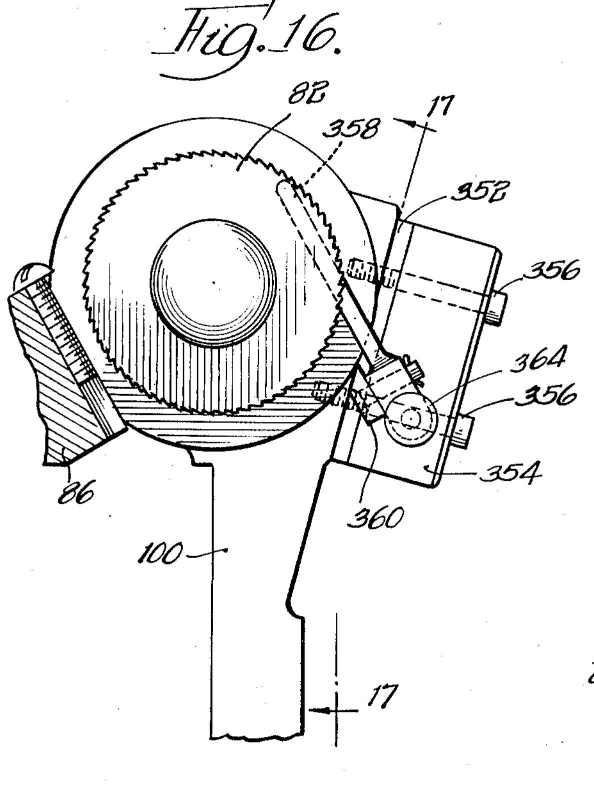
Figure 16 is a fragmentary view in vertical section taken along the line 16—16 of Figure 15.
Figure 17:
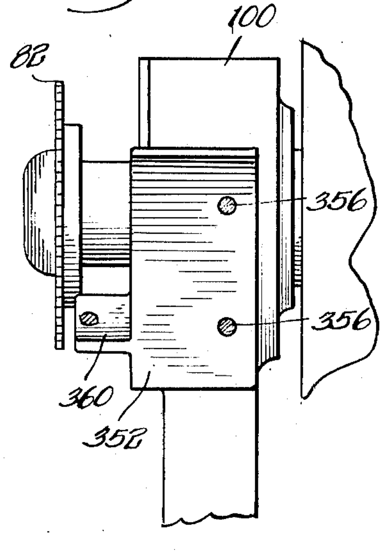
Figure 17 is a fragmentary view taken substantially along the line 17—17 of Figure 16.

As shown in Figures 15 to 17, the machine may be provided with cut-off means for detecting a broken slotter saw. Such means may comprise brackets or mounting plates 352 secured to the arm 100 of the mounting frame for the saw 82 and the corresponding arm of the mounting frame for the saw 76. These mounting plates and microswitch units 354 are fastened to those arms by screws 356. Levers 358 are pivoted intermediately their ends on lugs 360 of the mounting plates 352 and are formed with rounded upper ends urged into contacting relation with the saws by means of springs 362 encircling lugs on the levers and the mounting plates and interposed therebetween.

As illustrated in Figure 16, the rounded upper end of each lever 358 engages the body of the associated saw at a point inwardly of, but adjacent the teeth of the saw. At its other end, each lever 358 is provided with a threaded aperture receiving a set screw 364 secured in adjusted position by a nut 366. The screw 364 engages the operating plunger 368 of the switch unit 354. A dust cover 370 encloses the switch unit and its operating plunger.

The microswitch units may be connected in series in the usual relay control circuit for the saw drive motor 62 (Figures 1 and 2) to open the motor circuit when, on breakage of a saw or stripping of its teeth, the upper end of a lever 358 is freed for outward movement under the action of its spring 362 to operate its associated switch unit 354.

Figures 18, 19:
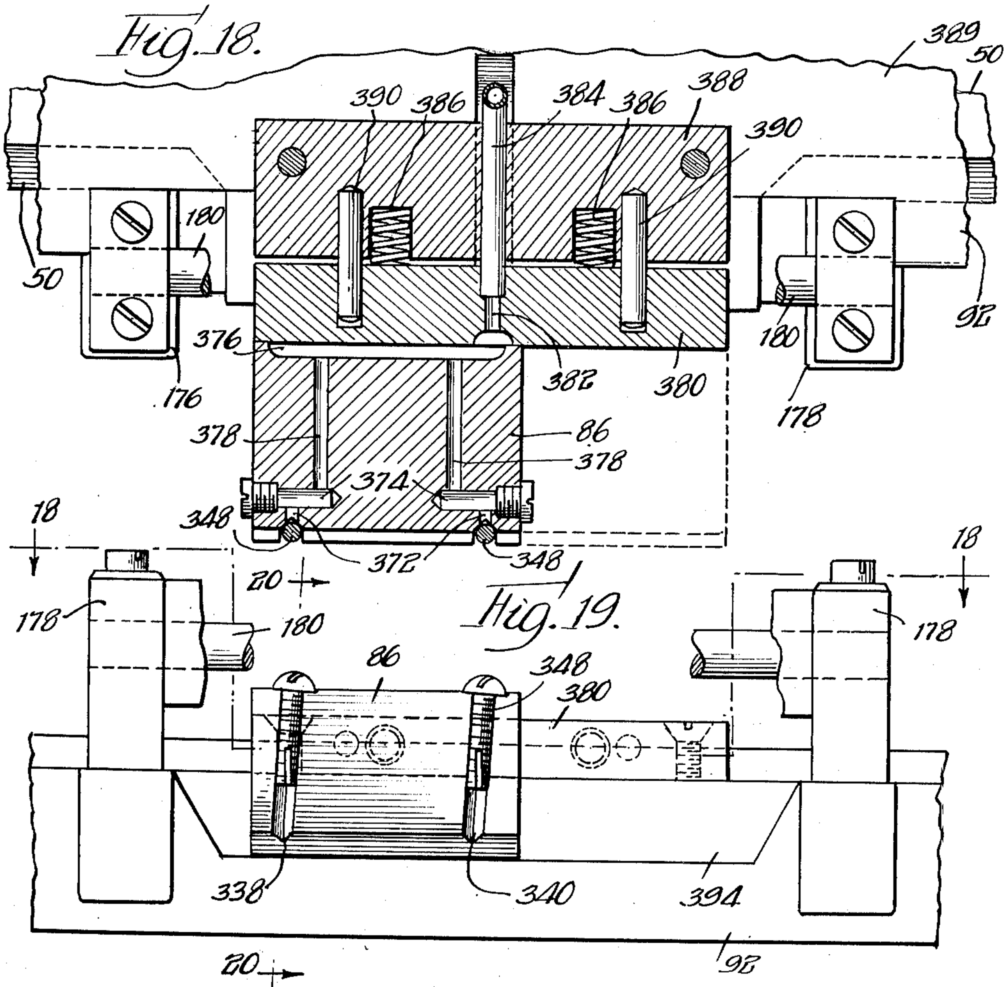
Figure 18 is a fragmentary view in horizontal section taken along the line 18—18 of Figure 19.
Figure 19 is a fragmentary view in elevation, with parts broken away, of a modified form of screw transfer means.
Figure 20:
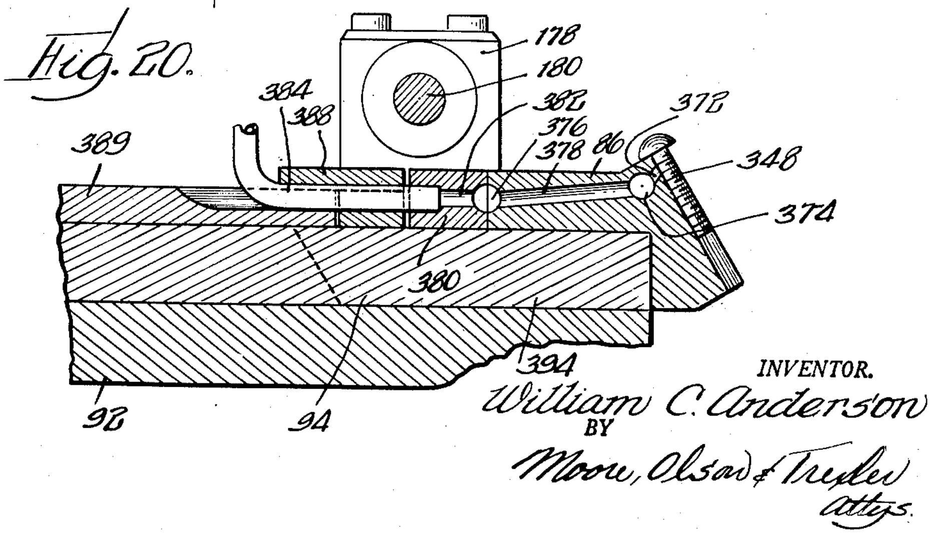
Figure 20 is a fragmentary view in vertical section taken along the line 20—20 of Figure 19.

As shown in Figures 18 to 20, the machine may be provided with suction means for holding screws securely seated in the V slots of the carrier 86 when the machine is being used at very high speeds, or when handling short, top heavy screws. For that purpose, each of the screw receiving V slots 338 and 340 in the outer face of the carrier 86 is provided in the base of the V with one or more small openings or slots 372 in fluid communication with longitudinal fluid communicating passages 374 in the body of the carrier. The passages 374 are maintained in fluid communication with a longitudinal slot 376 in the rear face of the carrier by transverse fluid passages 378. A stationary suction plate 380 rests upon the extension 94 of the slide bar 50 and abuts the rear face of the carrier 86. The suction plate is provided with a centrally positioned, transverse passage 382 which, by reason of the fact that slot 376 is of length at least equal to the distance of movement of the carrier, is constantly in communication with the passages of the carrier. A supply pipe, hose or other conduit means 384 is connected to the passage 382 and to a suitable vacuum pump (not shown) or other source of sub-atmospheric pressure.

The suction plate is yieldably maintained in engagement with the carrier by springs 386 seated in recesses in a stationary plate 388 secured in any convenient manner to a fixed support 389 mounted on the bed 92 and abutting the brackets 176 and 178 (Figure 4) for the pivot shaft 180. Pins 390 received in companion apertures in the plates 380 and 388 hold the suction plate against longitudinal movement. It will be evident that the suction pressure in the conduit 384 is communicated to the openings in the bases of the V slots and, therefore, the suction pressure applied to the shanks of the screws firmly hold the screws to the carrier during their conveyance to and from the slotter saws.

From the foregoing, it will be seen that the reciprocating bar 50 moves a very short distance between two limiting positions or slotting stations and that as it moves from one slotting station to the other, the feed chute is kept closed at its lower end to prevent screws from falling therefrom; the screw element just slotted is ejected from the screw carrier, and a new screw element is carried to the other slotting station.

It has been found possible by this machine to slot screws at a tremendously higher rate of speed than has been heretofore possible with other types of slotters.

In the event that a screw carrier fails to receive a screw element from the feed chute, the screw clamp carried by the lever 184, or a corresponding screw clamp carried by the lever 182, will permit its associated lever to move downwardly a greater than normal amount and the electric switch 222 associated with the lever 184, or a corresponding switch associated with the lever 182, will actuate an alarm or stop the machine, after a predetermined number of screws have been missed, through a time delay relay.

It has been pointed out that the reciprocating bar 50 is preferably counterbalanced by a similar bar 52 actuated in 180-degree phase relation by the common cam 48. It will, of course, be appreciated that the counterbalancing bar 52 may be provided with a screw carrier corresponding to the screw carrier 86, and that duplicate screw clamping, ejecting and slotting mechanisms may be provided, and the capacity of the machine thus doubled. It will also be appreciated that the reciprocating bars could be greatly extended in length, and that there could be several feeding stations and slotting saws on each bar.

It will be further evident that the principles embodied in this machine and the mechanisms shown herein may be adopted for the slotting of heads of screw elements or other headed fasteners by so arranging the mechanisms that the reciprocating screw carrier presents the heads of the screws rather than the shanks of the screws to the slotter saws 76 and 82.

The machine can be driven at different rates of speed by changing gears 32 and 34. Some types of screws flow quickly and freely down the hopper chute 88, and the machine is set at a high speed to handle these screws. Other screws, particularly those with a short shank and large head, can be fed only at a slower rate, and the speed of the machine must be reduced to suit these.

In order to hold screws securely seated in the V slots of the holder 86 when the machine is being used at very high speeds, a vacuum system can be used as an accessory.

While for the puropse of illustrating and describing the present invention, it has been convenient to show the invention as applied to a particular operation and certain components have been employed in the assembly of the machine, it is to be understood that the invention is not to be limited thereby, since such variations in the components, in their arrangements, and in the general assembly are contemplated as may be commensurate with the spirit and scope of the invention set forth in the following claims.

This invention is hereby claimed as follows:

1. An automatic screw slotting machine having a reciprocable block for carrying screw elements, a screw slotting saw for slotting said screw elements mounted in said block, bilaterally resilient clamping means for clamping said screw elements in said block while being acted on by said saw, a source of screw elements for supplying screw elements to said block, and means connected to said clamping means for producing an indication whenever the clamping means moves too far because said block has not received a screw element from said source.

2. An automatic screw slotting machine having a reciprocable block for carrying screw elements, a pivotally mounted screw slotting saw arranged for movement toward and away from said block, bilaterally resilient means for clamping a screw element in said block for holding said screw element while being acted on by said saw, said means including a pivoted lever connected to a reciprocable member, cam means for actuating said block and said reciprocable member, bilaterally resilient means interposed between said reciprocable member and said lever, positive means for limiting the movement of said lever in one direction relative to said reciprocable member, and signal means including a microswitch positioned so as to be actuated by said lever whenever said lever is actuated by said spring to the limit of its movement.

3. An automatic screw slotting apparatus comprising a reciprocable block for carrying screw elements, said block having a pair of recesses, a source of screw elements for supplying screw elements intermittently one at a time to said recesses, bilaterally resilient means for clamping screw elements in said block, a pair of pivotable slotting saws arranged to pivot toward and away from said block, means for periodically reciprocating said block, bilaterally resilient means for periodically latching said block in position, and means for alternately holding said slotting saws out of engagement with screw elements held by said reciprocable block.

4. An automatic screw slotting machine comprising a reciprocable block for carrying screw elements, shiftable bilaterally spring biased means positioned externally of said block for clamping screw elements against said block, a pivotally mounted screw slotting saw, shiftable extraction means for ejecting slotted screw elements from said block, and means for reciprocating said block and shifting said clamping means, said ejecting means and said slotting saw in timed relation to position a screw element carried by said block in the path of the saw, clamp the screw to the block, shift the saw into and out of engagement with a clamped screw, release the clamped and slotted screw element and eject the slotted screw element from the block.

5. An automatic screw slotting machine comprising a reciprocable block for carrying screw elements, means external of said block for rigidly securing screw elements in said block, extraction means external of said block and shiftable toward and away from the path of reciprocation of said block for ejecting slotted screw elements from said block, a pair of substantially axially aligned pivotally mounted screw slotting saws pivotally about a common axis, sequence operation means including a plurality of cams for controlling the action of said screw holding and ejecting means and for alternately moving said slotting saws toward and away from said block, a cam having large dwells for reciprocating said block, and bilaterally spring biased latching means for holding said block in fixed position during the dwell period of said cam, said latching means being arranged to be released by said sequence operation means.

6. An automatic screw slotting apparatus comprising a reciprocable block having a pair of recesses in the face thereof for receiving and carrying screw elements, means for supplying screw elements to said recesses, a pair of extraction ejectors bilaterally spring biased, a cam for actuating said ejectors to alternately move each ejector out of and into the path of reciprocation of said screw elements, a pair of movable slotting saws, means for alternately placing the screw elements in the paths of said saws as the block is reciprocated, and means for reciprocating said block and alternately shifting said saws in timed relation toward said block alternately to slot the screw elements in the recesses of the block.

WILLIAM C. ANDERSON.

REFERENCES CITED

The following references are of record in the file of this patent:

UNITED STATES PATENTS

| Number | Name | Date |
|---|---|---|
| 40,588 | Rhodes | Nov. 10, 1863 |
| 150,667 | Aiken | May 12, 1874 |
| 580,171 | Allen | Apr. 6, 1897 |
| 696,756 | Rundquist | Apr. 1, 1902 |
| 907,435 | Alfery | Dec. 22, 1908 |
| 1,058,813 | Townsend | Apr. 15, 1913 |
| 1,151,020 | Kunz | Aug. 24, 1915 |
| 1,292,245 | Bunker | Jan. 21, 1919 |
| 1,408,916 | Wilcox | Mar. 7, 1922 |
| 1,520,684 | Aldeen | Dec. 20, 1924 |
| 1,584,263 | Wilcox | May 11, 1926 |
| 1,611,177 | Fenlason | Dec. 21, 1926 |
| 1,629,705 | Holmeberg | May 24, 1927 |
| 1,793,646 | Stimpson | Feb. 24, 1931 |
| 1,899,221 | Ward | Feb. 28, 1933 |
| 1,921,403 | Bell | Aug. 8, 1933 |
| 1,938,939 | Smith | Dec. 12, 1933 |
| 1,962,742 | Jongedyk | June 12, 1934 |
| 1,966,510 | Medbury | July 17, 1934 |
| 2,221,464 | Lahodiakin | Nov. 12, 1940 |
| 2,253,515 | Grob | Aug. 26, 1941 |
| 2,311,268 | Tannewitz | Feb. 16, 1943 |
| 2,423,704 | Hood | July 8, 1947 |
| 2,487,187 | Seigfried | Nov. 8, 1949 |
| 2,528,330 | Bechler | Oct. 31, 1950 |